US012714252B2

(12) United States Patent
Thiele et al.

(10) Patent No.: US 12,714,252 B2
(45) Date of Patent: Aug. 25, 2026

(54) METHOD FOR PEELING POTATOES AND FOOD PROCESSOR

(71) Applicant: VORWERK & CO. INTERHOLDING GMBH, Wuppertal (DE)

(72) Inventors: Tobias Thiele, Radevormwald (DE); Svenja Stolze, Grevenbrioch (DE); Andreas Merta, Wülfrath (DE); Andreas Heynen, Radevormwald (DE); Felix Thies, Wuppertal (DE); Michael Sickert, Ennepetal (DE); Kevin Schmitz, Haan (DE); Sebastian Jansen, Bochum (DE); Lukas Irnich, Hürtgenwald (DE); Malte Becker, Aachen (DE); Maximilian Klodt, Aachen (DE); Lars Müller-Tönissen, Aachen (DE)

(73) Assignee: VORWERK & CO. INTERHOLDING GMBH (DE)

( * ) Notice: Subject to any disclaimer, the term of this patent is extended or adjusted under 35 U.S.C. 154(b) by 711 days.

(21) Appl. No.: 17/854,731

(22) Filed: Jun. 30, 2022

(65) Prior Publication Data

US 2023/0024102 A1 Jan. 26, 2023

(30) Foreign Application Priority Data

Jul. 21, 2021 (EP) .................................... 21186946

(51) Int. Cl.
*A47J 17/18* (2006.01)
*A23N 7/02* (2006.01)
(Continued)

(52) U.S. Cl.
CPC ............ *A47J 17/18* (2013.01); *A47J 27/004* (2013.01); *A47J 43/046* (2013.01)

(58) Field of Classification Search
CPC ................................ A47J 43/046; A47J 44/00
See application file for complete search history.

(56) References Cited

U.S. PATENT DOCUMENTS 4,998,467 A 3/1991 Kovach
5,289,760 A * 3/1994 Barradas ............ A47J 37/1271 99/330

(Continued)

FOREIGN PATENT DOCUMENTS

EP 3590393 A1 1/2020
WO WO2001034007 A1 5/2001
WO WO2016168889 A1 10/2016

OTHER PUBLICATIONS

Cuemath, "Linear Interpolation Formula", 2021, https://www.cuemath.com/linear-interpolation-formula/ (Year: 2021).*

(Continued)

*Primary Examiner* — Erik Kashnikow
*Assistant Examiner* — Ariel M Rodgers
(74) *Attorney, Agent, or Firm* — Barnes & Thornburg

(57) ABSTRACT

A method for peeling potatoes with a food processor and a food processor which comprises for food preparation a detachable food preparation vessel, a heating element for heating a food in the food preparation vessel and a rotatable tool for mixing or chopping the food in the food preparation vessel. The method includes attaching a potato peeling disc having an abrasive structure on its surface from above to the tool which is located centrally at a bottom of the food preparation vessel to establish a manually releasable, rotationally coupled connection such that in operation the potato peeling disc rotates at the same rotational speed as the tool; addition of potatoes into the food preparation vessel from above onto the potato peeling disc; motorized rotation of the tool in a first direction of rotation and peeling of the potatoes (Continued)

with the potato peeling disc inside the food preparation vessel.

16 Claims, 5 Drawing Sheets

(51) Int. Cl.

| | |
|---|---|
| ***A47J 27/00*** | (2006.01) |
| ***A47J 43/046*** | (2006.01) |
| ***A47J 44/00*** | (2006.01) |

(56) References Cited

U.S. PATENT DOCUMENTS

| | | | | |
|---|---|---|---|---|
| 8,262,005 | B2 * | 9/2012 | Garcia | A47J 43/0777<br>241/37.5 |
| 2008/0060533 | A1 * | 3/2008 | Choi | A23N 7/02<br>99/631 |
| 2009/0090255 | A1 * | 4/2009 | Karasawa | A23N 7/02<br>99/593 |
| 2010/0212519 | A1 | 8/2010 | Haukas et al. | |
| 2013/0125763 | A1 * | 5/2013 | Valance | H05B 1/0261<br>99/325 |
| 2016/0256004 | A1 * | 9/2016 | Kolar | A47J 43/0716 |
| 2018/0160839 | A1 * | 6/2018 | Thomas | A23N 7/02 |
| 2021/0093123 | A1 * | 4/2021 | Stein | A47J 36/32 |

OTHER PUBLICATIONS

Search Report issued to EP 21186946.6 mailed Jan. 21, 2022 (2 pages).

* cited by examiner

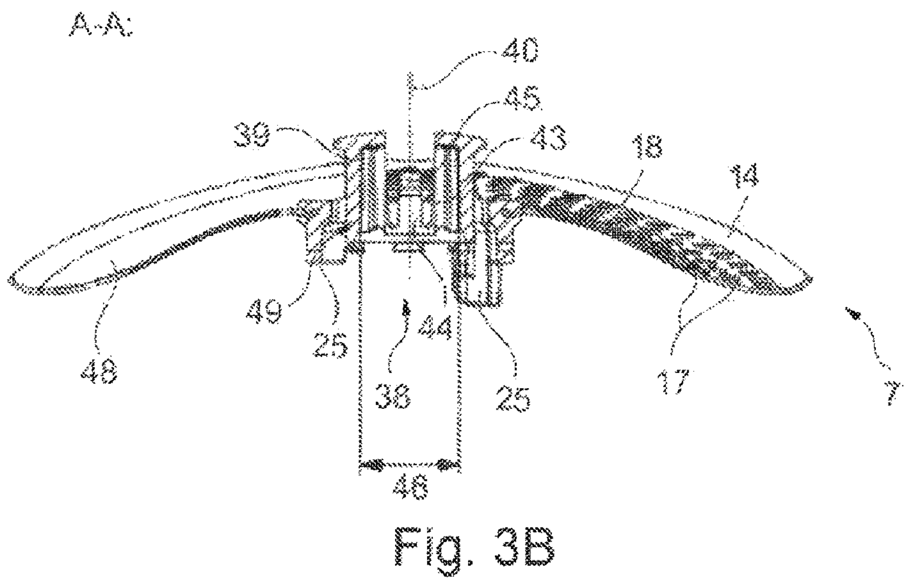
Fig. 3B
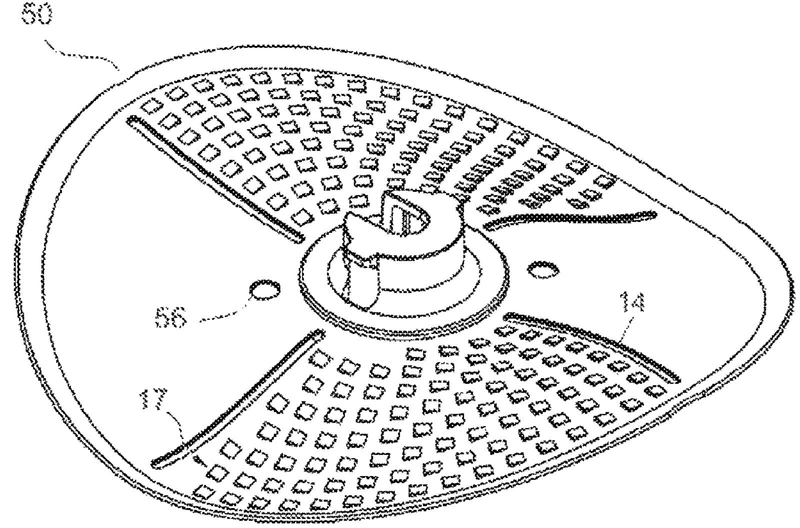
Fig. 4
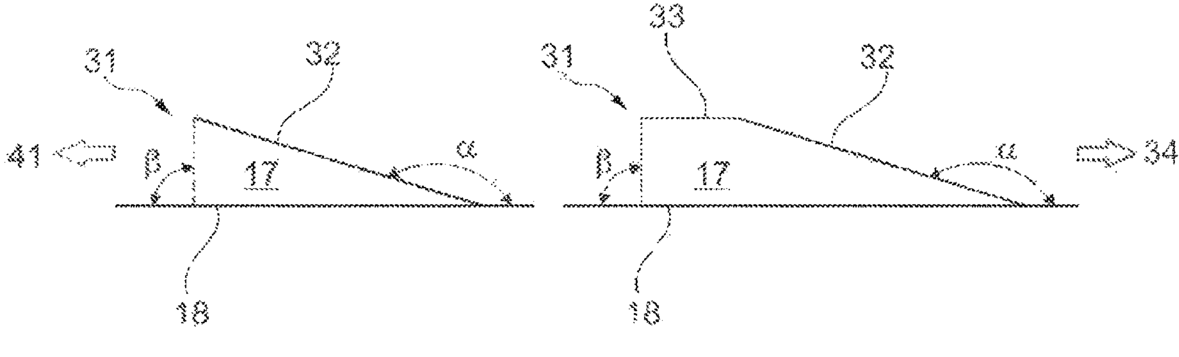
Fig. 5A
Fig. 5B

METHOD FOR PEELING POTATOES AND FOOD PROCESSOR

CROSS-REFERENCE TO RELATED APPLICATION

This application claims benefit of priority from European Application No. 21186946.6, filed on Jul. 21, 2021, which disclosure is hereby incorporated in its entirety by reference herein.

TECHNICAL FIELD

The disclosure relates to a method for peeling potatoes and to a food processor.

BACKGROUND

There are potato peeling machines that rotate discs with an abrasive surface to peel potatoes. Among the known potato peeling machines are, for example, Kenwood Chef AT444 and Melissa 16220007.

SUMMARY

A method for peeling potatoes with a food processor, the food processor comprising for food preparation a removable food preparation vessel, a heating element for heating a food in the food preparation vessel, and a rotatable tool for mixing or chopping the food in the food preparation vessel, with the following steps:

- Attaching (plugging) a potato peeling disc having an abrasive structure on its surface from above to the tool which is located centrally at a bottom of the food preparation vessel to establish a manually releasable, rotationally coupled connection such that, in operation, the potato peeling disc rotates at the same rotational speed as the tool;
- adding of potatoes into the food preparation vessel from above onto the potato peeling disc;
- motorized rotation of the tool in a first direction of rotation and peeling of the potatoes with the potato peeling disc inside the food preparation vessel.

The method enables a food processor, which is provided for preparing a food in a food preparation vessel by means of heating and chopping or mixing, to be used additionally for peeling potatoes. By attaching a potato peeling disc from above to the rotatable tool of the food processor, the existing drive of the food processor is used to drive the potato peeling disc for peeling potatoes. As a result, the user no longer needs a specialized machine for peeling potatoes, nor does he need to carry out a time-consuming conversion of an existing food processor.

BRIEF DESCRIPTION OF THE DRAWINGS

The figures show:

FIG. 3B illustrates a schematic sectional view centrally through the potato peeling disc, in particular of FIG. 3A;

FIG. 4 illustrates a schematic perspective view of a potato peeling disc, in particular of FIGS. 3A and/or 3B;

FIG. 5A illustrates a schematic representation of first tooth variants of a potato peeling disc according to the present disclosure;

FIG. 5B illustrates a schematic representation of second tooth variants of a potato peeling disc according to the present disclosure;

DETAILED DESCRIPTION

Figure 1:
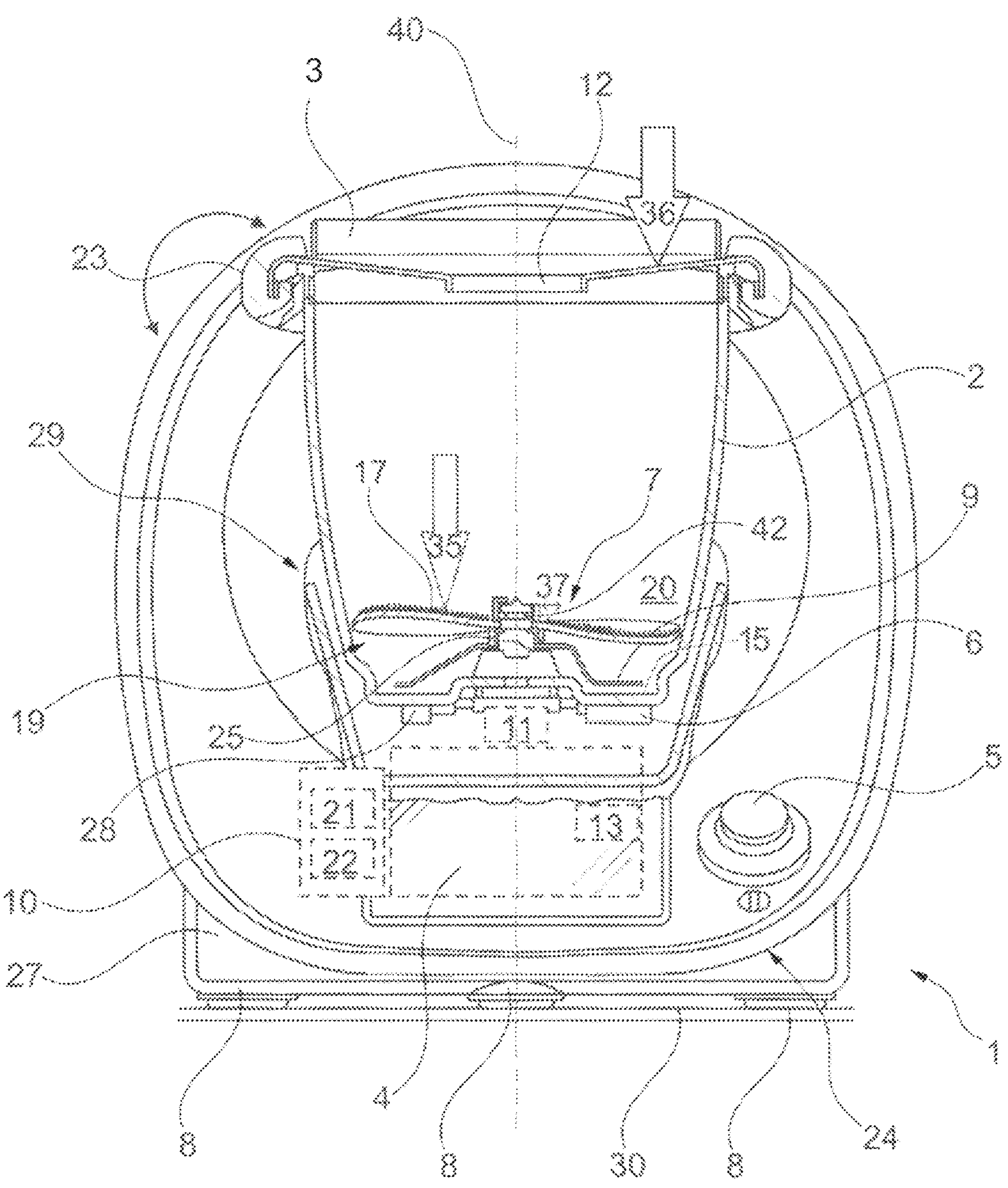
FIG. 1 illustrates a schematic representation of a potato peeling disc according to the present disclosure, which is manually releasably attached from above to a tool for mixing or chopping of a food processor (shown in partial section)

FIG. 1 shows a food processor 1 for performing a food preparation process in a food preparation vessel 2. A heating element 6 may be installed for heating a food 20, in particular on a lower side of a bottom 15 of the food preparation vessel 2. A rotatable tool 9, in particular having a cutting edge, which is coupled to a drive 11 for motorized rotation of the tool 9 via a shaft not shown, in particular extending through an opening in the bottom 15 of the food preparation vessel 2, may be used for chopping and/or mixing the food 20. A housing 27 of the food processor 1 encloses the drive 11 and provides a receptacle 29 for the food preparation vessel 2. The drive 11 comprises an electric motor that may be controlled by a control device 10 of the food processor. In particular, the control device 10 may control functional components of the food processor such as the heating element 6 and/or the drive 11. Measurement sensors for detecting an actual state such as a temperature sensor 28 may be provided. In particular, at least one weight sensor 8 is provided in one of the standing feet of the food processor 1 through which the housing 27 stands on a ground 30. Signals of the at least one measuring sensor for temperature measurement or weight measurement are transmitted to the control device 10 to be processed there. The control device 10 comprises a processor 21 and a memory 22.

FIG. 1 illustrates how a potato peeling disc 7, which has an abrasive structure on its surface 18, is manually attached 35 from above to the tool 9, which is centrally located at the bottom 15 of the food preparation vessel 2, in order to produce a likewise manually releasable, rotationally coupled connection with the tool, so that in operation the potato peeling disc 7 rotates at the same rotational speed 26 as the tool 9. Preferably, the rotational coupling takes place by means of a driver 25, which extends downwards at the lower side of the potato peeling disc towards the bottom 15 of the food preparation vessel 2. A radially extending arm of the tool 9, which comprises a cutting edge, thereby abuts against the driver 25 during rotation and henceforth rests against the driver 25 during the rotational movement in order to push the driver 25 in front of it. The tool 9 has at least one such arm, but at most six, preferably exactly four such arms. The at least one arm or all arms of the tool 9 extend in an axial region below the free end of the tool 9.

In particular, the potato peeling disc 7 has no further structure for rotational coupling with the tool 9, which facilitates attaching 25. A complex, correct and precise rotational alignment for attaching 25 can thus be omitted. In particular, the potato peeling disc 7 comprises a latch arm 44 extending parallel to the central axis 40 about which the potato peeling disc 7 rotates in operation. The latch arm 44 can be elastically pivoted radially. Preferably, the latch arm 44 has a latching lug 45 directed inwardly toward the central axis 40 (cf. FIG. 3B). When attaching 35, the user first places the potato peeling disc 7 with the opening 38 centered on a free end of the tool 9, which extends upward and is centered on the central axis 40 and, in particular, is rotationally symmetrical. The inner contour 39, which abuts the outer lateral surface of the free end of the tool 9 at a plurality of locations or areas distributed over the inner circumference, is pushed onto the free end of the tool 9. When the free end reaches the latching lug 45 during attaching 35, additional manual pressure from above is to be applied to the potato peeling disc 7 by the user to displace the latch arm 44 with the latching lug 45 radially outward, thereby pivoting it. The latching lug 45 grinds along the outer lateral surface of the free end of the tool 9 in the further attachment movement until a circumferential annular groove 42 of the tool 9 is reached which is located in the region of the free end of the tool 9 and extends around the central axis 40 on a plane perpendicular to the central axis 40. The annular groove 42 is a closed, circumferential recess in the free end of the tool 9. When the latching lug 45 reaches the annular groove 42, latching 37 of the latching lug 45 occurs radially in the direction of the central axis 40 into the annular groove 42. The contour of the latching lug 45 is adapted to the contour of the annular groove 42. The latch arm 44 then springs back radially inward and/or resumes its position oriented parallel to the central axis after latching 37, The potato peeling disc 7 has reached its intended attaching position in the axial position of latching 37. The potato peeling disc is held in the axial position relative to the tool 9 by the latching 37. If, during operation, axial forces act on the potato peeling disc 7 due to a non-uniform weight distribution of the potatoes, a non-uniform movement of the potatoes or due to an ascending water flow of a water bath, an unscheduled release of the potato peeling disc 7 (upwards) from the intended attaching position or a release from the tool 9 can thereby be avoided.

In one configuration, the control device 10 is configured such that it detects when the intended attaching position is reached by means of an evaluation of the signals of at least one weight sensor 8 and/or allows activation of a potato peeling mode only when the potato peeling disc 7 is in the intended attaching position. The latching 37 generates a movement pulse that can be detected by means of the weight sensors 8.

After attaching 25 the potato peeling disc 7, a lid 3 is closed by placing 36 the lid 3 on the food preparation vessel 2 from above. A locking device 23 may be provided to lock the lid 3 in the closed state, for example with rollers as shown in FIG. 1, by a pivoting movement illustrated with arrows.

Potatoes are added to the food preparation vessel 2, in particular through the lid opening 12 of the lid 3. Preferably, water is added to the food preparation vessel 2, preferably until the entire potato peeling disc is immersed, in particular up to a maximum of about 1 cm or 6 cm above the uppermost point of the potato peeling disc 7. At 1 cm, there is a comparatively strong flow of water from the bottom to the top which hits the potatoes during peeling, preferably from below through openings in the potato peeling disc 7. At 6 cm, the potatoes roll through the water bath on the potato peeling disc 7 during peeling, so that peeled residues are removed from the potato surface as a result. For example, a total of 600 ml of water is added.

To start the peeling process, the tool 9 is rotated in a motorized manner in a first direction of rotation 41. Peeling edges of the abrasive structure on the surface 18 of the potato peeling disc 7 come into engagement with the potatoes located on the potato peeling disc 7 within the food preparation vessel 2 due to the rotation in the first direction of rotation 41. In one configuration, exemplarily illustrated in FIG. 1, the abrasive structure may be serrated or tetrahedral. Preferred also for the exemplary embodiment of FIG. 1 are ramp-shaped projections for forming the abrasive structure. In a further configuration, the abrasive structure for the exemplary embodiment of FIG. 1 may have been produced by an abrasive having a grain size which is at most 800 μm, in particular at most 600 μm and/or at least 500 μm. All these possible variants will be discussed in more detail later.

The user can receive information and instructions from the control device 10 and make inputs to the control device 10 via a user interface 24, which in particular comprises a touchscreen display 4 or a button 5. Preferably, the button 5 is a rotary knob. In one configuration, the user is enabled to manually adjust, readjust or set the peeling time, preferably by means of the knob.

The user interface 24 may comprise user-operable icons 13 on the touchscreen display 4. Preferably, the control device 10 has access to digital recipes with multiple recipe steps that can be implemented by means of the user interface 24 by the user and the food processor to prepare a food 20.

Generally, the control device 10 on the basis of one or more cooking parameters which are defined in the digital recipe or manually set by the user via the user interface 24 ensures that a food 20 is prepared in the food preparation vessel 2 in a desired manner by controlling the heating element 6 and/or the drive 11 accordingly. The peeling process may be programmed as a recipe step in such a digital recipe. Potatoes then represent the food 20, which are hidden in FIG. 1 for clarity.

In one configuration, a potato peeling mode is provided. The potato peeling mode may be activated by a recipe step and/or by the user by means of the user interface 24. When the potato peeling mode is activated, it is preferably provided that the control device 10 rotates the tool 9 at a predefined rotational speed 26 (cf. FIG. 2) in the first direction of rotation 41. In particular, the predefined rotational speed 26 and/or a peeling time 47 is fixedly predefined and/or suggested to the user via the user interface 24, e.g. by means of an output or display via the touchscreen display 4.

A potato peeling disc 7 preferably has—as shown in FIGS. 1, 3 and 4—a wave shape 19 with a plurality of teeth 17 on its surface 18.

Figure 2:
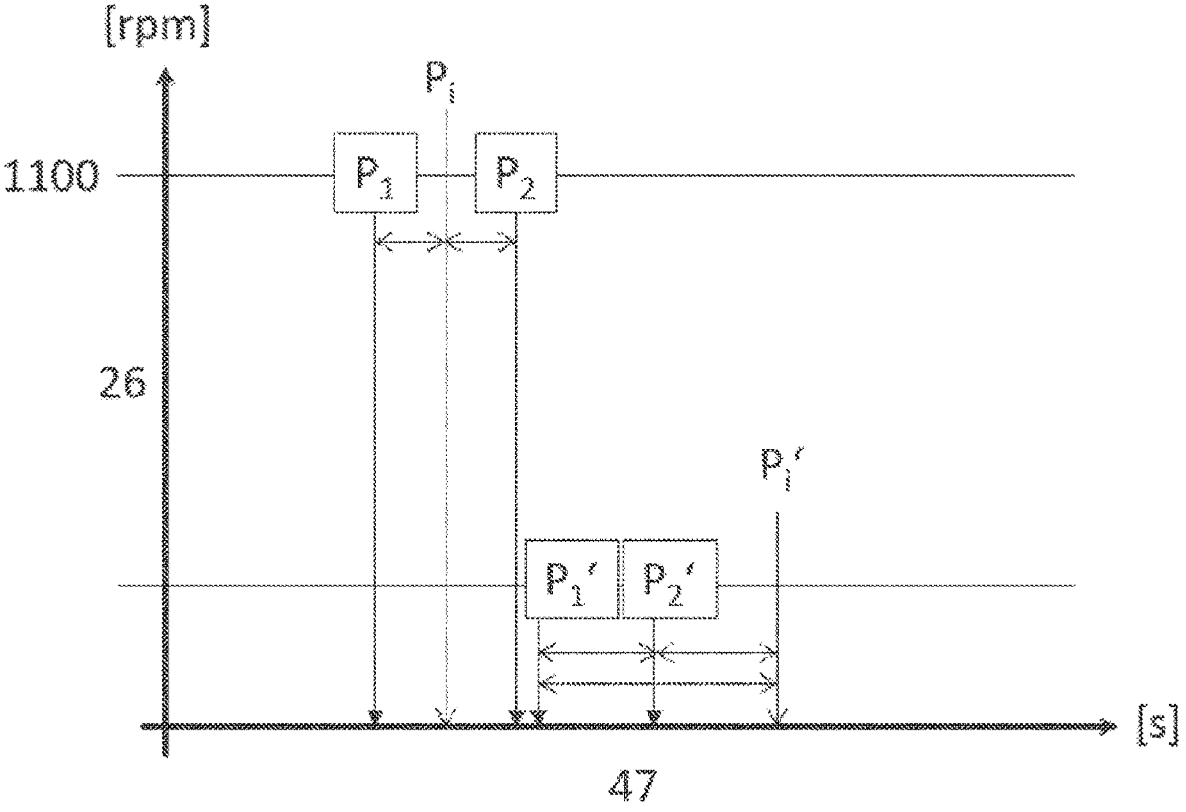
FIG. 2 illustrates a schematic illustration of a determination method for a peeling time.

FIG. 2 illustrates a configuration in which the food processor 1, which has determined a weight of the potatoes in the food preparation vessel 2 in particular by means of the at least one weight sensor 8, determines a peeling time 47 depending on the determined weight, so that the tool 9 can be rotated in the first direction of rotation 41 for the determined peeling time 47. FIG. 2, this configuration and the following description for FIG. 2 may also be applied in further developments in such a way that instead of the weight in a further development a potato size or in a further further development a weight and a potato size are used analogously. In FIG. 2, the unit "rpm" stands for "rotations per minute". The unit "s" stands for seconds.

At least two predefined pairs of values $P_1$, $P_2$ are stored in a memory 22 of the food processor 1 or of a cloud or server computer not shown. A first pair of values $P_1$ comprises a first peeling time 47, a first rotational speed 26 and a first state variable (first weight or first potato size or first weight and first potato size) for which the first peeling time 47 of the first pair of values $P_1$ is to be applied in the first direction of rotation 41 with the first rotational speed 26. A second pair of values $P_2$ comprises a second peeling time 47, the first rotational speed 26 and a second state variable (second weight or second potato size or second weight and second potato size) for which the second peeling time 47 of the second pair of values $P_2$ is to be applied in the first direction of rotation 41 with the first rotational speed 26.

When the peeling mode is activated, the control device 10 causes the drive 11 to rotate the tool 9 and thus the potato peeling disc 7 in the first direction of rotation 41. The peeling time 47 for this rotation in the first direction of rotation 41 is determined by a processor 21 of the control device 10, a cloud or server computer by linear interpolation on the basis of the two predefined, i.e., stored, pairs of values $P_1$, $P_2$. The values comprised by the pairs of values $P_1$, $P_2$ are derived from tests by the manufacturer.

Based on the determined state variable, in particular when the peeling mode is activated, the processor 21 linearly interpolates the applicable peeling time 47 between the at least or exactly two pairs of values $P_1$, $P_2$. If the state variable is already present, the state variable is determined by accessing the present state variable determined.

For a linear interpolation, in particular, the following formula is used:

Interpolated peeling time (at point $P_i$ in FIG. 2)=first peeling time+(determined state variable−first state variable)×(second peeling time−first peeling time)/(second peeling time−first peeling time)

For example, the first pair of values $P_1$ includes the following: first rotational speed 26=1100 revolutions per minute, first state variable=first weight=500 g, first peeling time 47=180 s, in particular direction of rotation=first direction of rotation 41 (e.g. clockwise rotation). For example, the second pair of values $P_2$ includes the following: first rotational speed 26=1100 rpm, second state variable=second weight=800 g, second peeling time 47=300 s, in particular direction of rotation=first direction of rotation 41 (e.g. clockwise rotation). Determined state variable=determined weight=650 g. Using the above formula, a linearly interpolated peeling time of 240 seconds is determined based on the determined weight of 650 g.

In one configuration, additionally pairs of values $P_1'$, $P_2'$ are stored for a second rotational speed, e.g. for 500 revolutions per minute. In a further development, the control device 10 may change to a second rotational speed based on a parameter for peeling. The parameter may be a desired and selectable peeling characteristic, such as "fast peeling" or exceeding a limit with respect to weight and/or potato size. The parameter may also be a recipe step specification or sensor information of physical properties from inside the food preparation vessel 2, e.g. the temperature. For example, at 500 rpm and 500 g potatoes, a peeling time of 5.25 s may be stored in the pair of values $P_1'$. A second pair of values $P_2'$ with 500 revolutions per minute may comprise, for example, a peeling time of 7 s for 650 g potatoes. Interpolation can also be performed accordingly. FIG. 2 shows by way of example that, using the formula given above, a peeling time can also be extrapolated if the determined weight is not between the weight of the first pair of values $P_2'$ and second pair of values $P_2'$. This applies analogously to the example explained above with the pairs of values $P_1$ and $P_2$. Therefore, for the sense of this application, the method of interpolation based on at least two pairs of values automatically also comprises extrapolation. Interpolated and extrapolated values always lie on one and the same straight line in an illustration as a function curve.

In one configuration, absolute lower limits and/or upper limits may be defined for the peeling time, which keeps the results of the interpolation or extrapolation within a defined range of values for the peeling time.

Figure 3A:
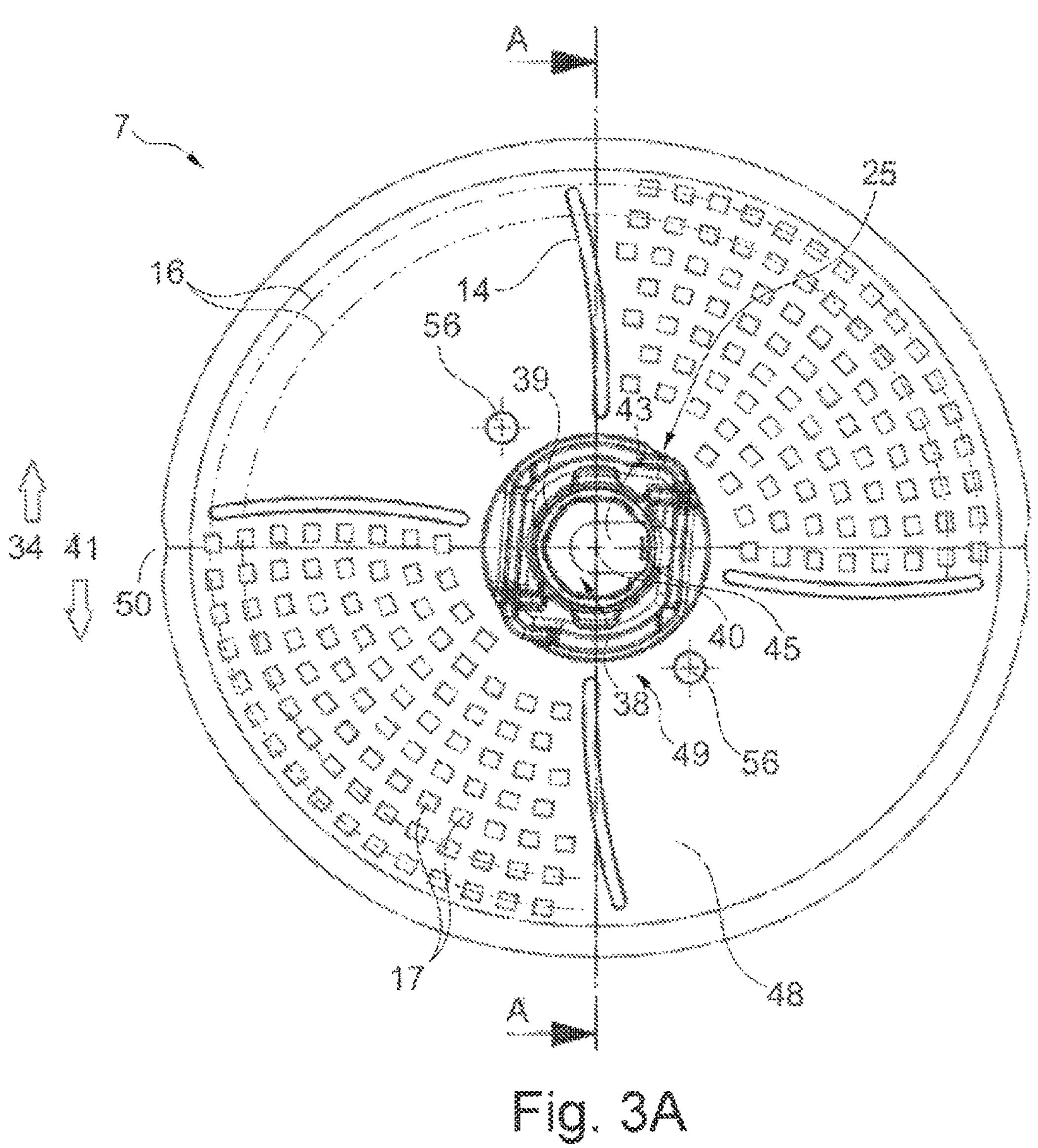
FIG. 3A illustrates a schematic representation of a lower side of a potato peeling disc according to the present disclosure.

FIG. 3A shows a potato peeling disc 7 according to the present disclosure, in particular with a diameter of at least 120 mm and/or at most 160 mm, preferably about 148 mm or 150 mm. As a result of the wave shape 19 (compare FIG. 1), the potato peeling disc 7 shown has a height of at least 20 mm and/or at most 40 mm, preferably about 28 mm or 30 mm. Preferably, the potato peeling disc 7 comprises a plurality of slits 14 extending in an arc shape within the inner and outer boundaries of the potato peeling disc 7 in a substantially radial direction and evenly spaced from each other in the circumferential direction. The individual arrangement of teeth 17 adjacent to slits 14 are arranged according to purely aesthetic considerations.

In the preferred exemplary embodiment of FIG. 3A, the teeth 17 are arranged in a plurality of annular tracks 16, i.e., along concentric circles about the central axis 40. Preferably, the orientation of the teeth 17 is in the direction toward the respective annular track 16, preferably parallel to a tangent to the annular track 16, wherein the tangent passes through an intersection of a central longitudinal axis of a tooth 17 with the annular track 16. In an alternative or supplementary configuration, the teeth 17 of the potato peeling disc are arranged in mutually parallel, straight rows, which extend in particular radially with respect to the central axis 40 and/or form regions with respective differently oriented, parallel rows.

In one configuration, the teeth 17 have a width transverse to their orientation of at least 1 mm and/or at most 5 mm, preferably at most 2 mm. In one configuration, the teeth 17 have a length parallel to their orientation of at least 1 mm and/or at most 5 mm. In one configuration, the teeth 17 have a height of at most 2 mm, but at least a height of 0.5 mm. In particular, the teeth are longer than wide and/or longer than high and/or wider than high and/or about as high as wide at a front side of the teeth 17.

An orientation of a tooth 17 is the direction of its longitudinal extension on the surface 18 of the potato peeling disc 7, wherein a front side of the tooth 17, which has a peeling edge for peeling, points in the direction of the orientation. A peeling therefore takes place by rotating in the first direction of rotation 41, which moves the tooth 17 substantially in the direction of its orientation.

Preferably, the first direction of rotation 41, which points essentially in the direction of orientation of the teeth 17, corresponds to clockwise rotation and the opposite, second direction of rotation 34 corresponds to counterclockwise rotation (cf. FIG. 3A). Alternatively, depending on the orientation of the teeth on the potato peeling disc, the first direction of rotation 41 may correspond to counterclockwise rotation and the second direction of rotation 34 to clockwise rotation.

In particular, as shown in FIG. 3A, the potato peeling disc 7 has a disc portion 48 extending radially fully outward from a central hub portion 49 having the opening 38 and the inner contour 39. The teeth 17 can be seen from below in FIG. 3A because, with the disc portion 48 having a substantially constant disc thickness, the teeth 17 protrude at the upper side. In particular, the teeth on the lower side form a depression corresponding to the projection contour on the surface. In particular, FIG. 3A shows such depressions corresponding to the projections of the teeth shown, for example, in FIG. 3B.

The teeth 17 are arranged on parallel annular tracks 16, which run coaxially around the central axis 40. The teeth themselves have a rectangular outer contour and/or are not curved. The teeth 17 have a substantially square outer contour in plan view and/or in bottom view. There are sections in the circumferential direction between two columns 14 between which the teeth have been omitted. There is a smooth surface 18 at the upper side (and lower side).

Tests have shown that a particularly small number of slits, e.g. four slits, create a particularly aesthetic impression on the user because special attention is then paid to them, creating an image that is relaxing for the user. On the other hand, a plurality of slits, e.g. eighteen slits in combination with an abrasive structure, can also be perceived as particularly aesthetic and appealing. For this perception by the user, it is irrelevant whether the slits at one angular position extend radially in a continuous opening or are divided into multiple openings. Such multi-part slits, e.g., slits divided into three parts in the direction of extension at one angular position, arouse an slit-surface overall impression in the user, which is also perceived as particularly attractive. The aesthetic impression on the user can be improved by a slightly curved course of the slits radially away from the central axis 40, because this has a dynamic and modern effect. In tests, users have found it particularly positive when the surface 18 is only partially covered with abrasive structures, because the alternation of smooth and non-smooth surface sections has a surprising and interesting effect. It conveys a feeling of innovation and high quality. In particular, this was obtained by four sections in the circumferential direction which have alternating smooth and abrasive structures. The individual arrangement of teeth 17, which are adjacent to slits 14, were also arranged according to purely aesthetic considerations.

The potato peeling disc 7 is attached to a tool 9 with the opening 38 for peeling potatoes. Radially inwardly directed beads extending along the central axis 40, which are distributed over the circumference of the inner contour 39, serve to ensure a stable fit of the potato peeling disc 7 on the rotatable tool 9 of the food processor 1. A cut-out 43 permits axial protrusion of a central end element of the tool, e.g. a fastening rivet and, at the same time, the creation of an axial latch arm 44 with a latching lug 45 projecting radially inwards at its free end, which can engage in a corresponding annular groove 42 of the tool 9 in the intended attaching position of the potato peeling disc 7 on the rotatable tool 9. A manually releasable, but stable fit of the potato peeling disc 7 in the attached state can thus be achieved. In particular, this is a snap-fit connection. A driver 25 enables coupling of the tool 9 with the potato peeling disc 7, so that a rotation of the tool 9 leads to a rotation of the potato peeling disc 7, in particular with the same rotational speed. At least one bore 56, preferably two bores 56, and/or at least one notch 50, preferably two notches 50, allow for improved water transport to the surface 18.

In one configuration, in the peeling mode, rotation is first performed in the first direction of rotation 41 for peeling and immediately thereafter in the second direction of rotation 34 for smoothing and/or polishing (without releasing or turning the potato peeling disc 7). In particular, a digital recipe and/or the control 10 is configured such that by means of the potato peeling disc 7 a combined process such as peeling and polishing, peeling and cooking, soaking and peeling and/or obtaining a different surface finish can be achieved for different food products, ingredients and/or foods such as potatoes or beets. Furthermore, a complex food preparation process (for example by a corresponding digital recipe or a corresponding manual setting on the food processor) is enabled, in which food is first peeled, then polished and finally cooked, preferably without releasing, turning or changing the potato peeling disc 7. The support of such a complex food preparation process by the user can be minimized or even eliminated except for activating the digital recipe and feeding the ingredients.

Using a reversed second direction of rotation 34, which is substantially opposite to the direction of orientation of the teeth 17, a food preparation of the "slow cooking" and "sous vide" type can be performed with the potato peeling disc 7 mounted in the same manner on the tool 9, which will be explained in the following in connection with the food processor shown in FIG. 1 and can also be implemented analogously with the rectangular ramp-shaped teeth 17 of the potato peeling disc of FIGS. 3A and 3B.

For a food preparation of the type "slow cooking" and "sous vide" the potato peeling disc 7 is attached 35 to the tool 9. Water and ingredients (with or without a bag around the ingredients or food 20) are filled into the food preparation vessel 2. The user can start the food preparation process via a second mode of the kitchen appliance 1 which is supported by the control 10 or by appropriate manual settings of a process time, a temperature and/or speed of the tool 9. The wave shape 19 and the rotational movement of the potato peeling disc 7 in the second direction of rotation 34, which is driven by the tool 9, causes a uniform mixing and temperature distribution in the food preparation vessel 2 and an optimal cooking of the food 20. Due to the compact design and wave shape 19 of the potato peeling disc 7, the volume of the food preparation vessel 2 can be optimally used. The teeth 17 have no effect on the food 20 in the second direction of rotation 34. Due to the rotation behavior in this second mode, a uniform temperature distribution of the food in the food preparation vessel 2 can be obtained.

In one configuration, it is provided that the potato peeling disc 7 has a further functional surface on the lower side, e.g. a smooth surface, with which "slow cooking" and "sous vide" can also be performed. In particular, when providing a potato peeling disc 7 with depressions on the lower side, the potato peeling disc 7 can, in one configuration, be attached upside down to the tool 9. The food 7 during the food preparation of the "slow cooking" and "sous vide" type is then moved along in an improved manner without damaging the food or a bag around the food.

FIG. 3B shows a schematic representation of a section running centrally through a potato peeling disc 7, in particular the potato peeling disc 7 of FIG. 3A. Also in FIG. 3B, the depressions of the teeth 17 on the lower side of the potato peeling disc 7 are visible. In the sectional representation shown, the potato peeling disc 7 has an overall curved shape. In particular, the disc portion 48 of the potato peeling disc 7 extends in a waveform around the hub portion 49. In the sectional view of FIG. 3B, the waveform is not visible due to the sectional representation. The driver 25 extends axially downward starting from the outer edge of the hub portion 49. The length of the driver 25 is at least half as long as the opening 38. FIG. 3B shows the cut-out 43 that creates the latch arm 44. The latching lug 45 is arranged at the free end of the latch arm 44.

In one configuration, the disc portion 48 has essentially the shape of a perforated disc in plan view, i.e., a disc with a central through bore. Preferably, also in the case of a potato peeling disc 7 having a wave shape, an inner edge of the disc portion 48 is on a plane perpendicular to the central axis 40. From this plane inner edge, which is preferably connected to the hub portion 49 in particular by a material bond (overmolding or bonding) or by a force fit (clamped from above and below), the disc portion 48 extends in the radial direction with different slopes depending on the angular position relative to the central axis 40. While the inner edge of the disc portion 48 is on a plane perpendicular to the central axis 40, the outer edge describes a wave in circumferential direction with at least one or two wave crests and wave troughs.

In particular, the potato peeling disc 7 comprises metal and/or is constructed in two parts or exactly three parts, i.e., produced from separately manufactured parts. Alternatively, the entire potato peeling disc 7 is produced in one piece by means of injection molding from plastic.

Preferably, the disc portion 48 is made of metal, preferably a sheet, in particular with a (constant) thickness of at least 1 mm and/or at most 2 mm. In one configuration, the hub portion 49 is produced from plastic, preferably polypropylene, and/or is overmolded around an inner edge region of the disc portion 48. Preferably, the hub portion 49 is also produced from two separately manufactured parts, in particular a lower part and an upper part. The diameter 46 of the opening 38 is 17 mm, preferably with a transition fit.

The front side of the teeth 17, which are arranged on the surface 18 at the edge of the slit 14, points approximately in the direction of the viewer in FIG. 3B.

FIG. 4 shows a potato peeling disc, in particular of FIGS. 3A and/or 3B, in a perspective representation from obliquely above. The ramp shape and orientation of the teeth 17 are clearly visible here.

FIGS. 5A and 5B show two tooth variants of potato peeling discs 7 according to the present disclosure, applicable for example to the configurations in FIGS. 1, 3, 4 and 7, in a side view transverse to the orientation of the respective tooth 17. Both tooth variants are ramp-like and also ramp-shaped. In the tooth variant of FIG. 5A, the tooth 17 has an inclined surface 32 on the rear side with an angle $\alpha$ between 140° and 170° to the surface 18 of the potato peeling disc 7. In addition to the tooth variant of FIG. 5A, the tooth variant shown in FIG. 5B also has a plateau 33 that is adjacent to the end of the inclined surface 32. In the tooth variants of FIGS. 5A and 5B, the inclined surface 32 and/or the plateau 33 may be made of sheet metal or may bound a projection made of solid material of the surface 18. The projection may also be created by forming a sheet metal. The peeling edge 31 preferably has an angle $\beta$ to the surface 18 between 80° and 100°, preferably about 90° or 91°. Preferably, a closed area of the surface 18 or a passage extends between the peeling edge 31 and the surface 18. Particularly preferably, the entire surface 18 of the potato peeling disc 7 is closed in a fluid impermeable manner except for the opening 38, the bore 56 and the slits 14. In one configuration, the inclined surface 32 of a ramp-like tooth 17, particularly the entire inclined surface 32, are rectilinear, planar and/or have a constant slope.

The front side of the tooth 17 is oriented in the first direction of rotation 41 and opposite to the second direction of rotation 34 in FIGS. 5A and 5B.

In a further development, the teeth 17 have an angular shape and/or have a first surface at the rear side with an angle $\alpha$ to the surface 18 of the potato peeling disc 7 and/or a second surface at the front side with an angle $\beta$ to the surface 18 of the potato peeling disc 7, respectively (cf. FIG. 4*b*). A plateau, which is preferably straight and/or substantially parallel to the surface 18 of the potato peeling disc 7, connects the first surface and the second surface. In particular, the angle $\alpha$ and/or the angle $\beta$ is between 80° and 100°, preferably about 90°. A normal of the first and/or second surface is oriented tangential, substantially tangential or parallel to the circumferential direction of the potato peeling disc 7.

Figure 6A:
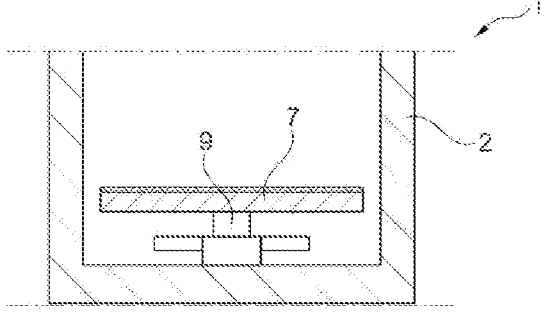
FIG. 6A illustrates a schematic cross-sectional view of a flat potato peeling disc in a food processor.

FIG. 6A shows a schematic cross-sectional view of a flat potato peeling disc in a food processor 1 (see FIG. 1), wherein the potato peeling disc is attached to a rotatable tool 9 of the food processor 1 and is located inside the food preparation vessel 2. In FIG. 6A only a section of the food processor 1 is shown. An abrasive structure with oriented teeth is shown in a simplified manner as a thick line on the upper side of the potato peeling disc 7. In the exemplary embodiments shown in FIGS. 6A, 6B and 6C, the abrasive structure may have a geometrically defined cutting edge (such as ramped or tetrahedral teeth) or a geometrically undefined cutting edge (such as made of an abrasive embedded in the surface 19). In addition, in the following exemplary embodiments, the potato peeling disc 7 just illustrated may be planar, wave-like, or wave-shaped.

Figure 6C:
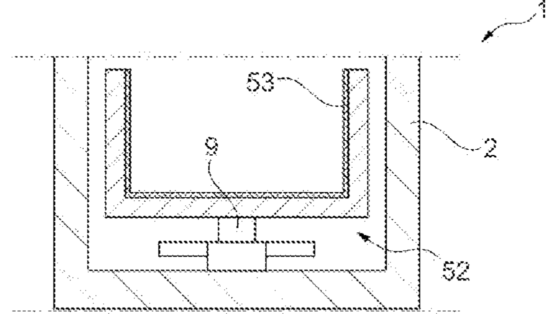
FIG. 6C illustrates a schematic cross-sectional view of a potato peeling pot insert in a food preparation vessel of a food processor.
Figure 6B:
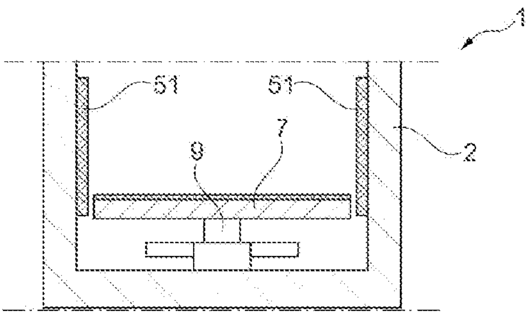
FIG. 6B illustrates a schematic cross-sectional view of a wall insert in a food preparation vessel of a food processor with attached potato peeling disc.

FIG. 6B shows a schematic cross-sectional view of the exemplary embodiment of FIG. 6A with an additional wall insert 51. Also at the wall insert 51, the abrasive structure is shown in a simplified manner as a thick line. The wall insert 51 is preferably flat, arcuate and/or adapted to the surface of the inner wall of the food preparation vessel 2 of the food processor 1 and/or can be manually releasably attached thereto. Potatoes are peeled more efficiently in this way.

FIG. 6C shows a schematic cross-sectional view of a potato peeling pot insert 52. Here, too, the abrasive structure is shown in a simplified manner as a thick line. A pot insert 52 can be produced from the potato peeling disc 7 as the base and a pot insert wall 53.

Figure 7:
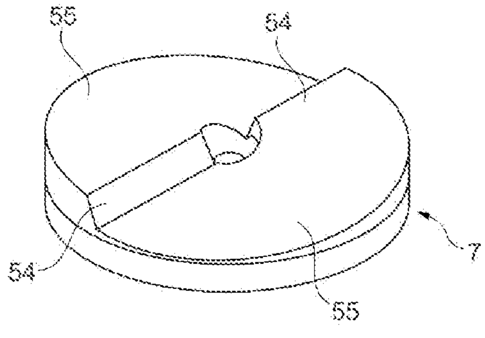
FIG. 7 illustrates a schematic representation of a geometry of a potato peeling disc (abrasive structure hidden).

FIG. 7 shows a schematic representation of a geometry of a potato peeling disc 7 comprising steps 54. The abrasive structure is again not illustrated for simplicity. In one embodiment, if the abrasive structure does not have a geometrically defined cutting edge, the abrasive structure may be provided by a releasable layer of at least 0.6 mm and/or at most 2 mm thickness, which may be changed as required. Ramp-shaped sections 55 extend in the circumferential direction up to such a step 54. Steps 54 and ramp-shaped sections 55 are therefore found alternating in the circumferential direction.

The potatoes are peeled in the raw state.

Motorized rotation of the tool means that the food processor causes the drive to rotate the tool. In particular, the tool is driven by a shaft of the drive, which extends centrally and at a right angle through the bottom of the food preparation vessel.

In one embodiment, the following additional process step is provided: motorized rotation of the tool with the potato peeling disc attached in an opposite second direction of rotation. This enables two things. First, other processing operations not involving peeling can be performed with the attached potato peeling disc without releasing and removing the potato peeling disc from the food preparation vessel. The abrasive structure may be configured to be abrasive only in the first direction of rotation. Second, independently of the configuration of the abrasive structure, the potatoes can be mixed in an improved manner so that an improved peeling result can be achieved.

In one embodiment, it is provided that multiple changes are made between the first direction of rotation and the second direction of rotation, preferably at a regular interval. In this way, peeling and cleaning can be performed in one process.

In one embodiment, the food processor has a potato peeling mode and, upon activation of the potato peeling mode, the food processor causes the tool to be rotated at a predefined rotational speed in the first direction of rotation and/or at a further, preferably different, predefined rotational speed in the second direction of rotation. A fixedly predefined rotational speed for the first and/or second direction of rotation allows a particularly reliable achievement of a reproducible peeling result. User errors are avoided controlled by a control device of the food processor. A food processor causes a tool to rotate, by controlling a drive for the tool accordingly, in particular by a control device of the food processor. A predefined rotational speed is a value of a desired rotational speed that has been stored in a memory of the control device.

The following embodiments relate to determining the peeling time in the first direction of rotation by the food processor.

While specialized potato peeling machines generally have a very large diameter in order to peel the largest possible area of potatoes in one revolution of a peeling disc, the bottom diameter of a food processor is relatively small, often only half the size or less compared to specialized potato peeling machines.

In order to nevertheless be able to provide a total peeling time acceptable to the user for peeling potatoes in a food processor with an acceptable or even good peeling result, the peeling speed should be increased, but without excessive waste.

A good peeling result is measured by little or no peel residues on a peeled potato despite the lowest possible waste and the shortest possible peeling time.

In one configuration, the food processor determines a weight of the potatoes in the food preparation vessel or provides the user with a potato weight to be filled in via the user interface. Determining the weight by the food processor is preferably done by means of at least one, preferably three, weight sensors integrated in the food processor. The food processor then determines a peeling time depending on the provided or determined weight, wherein the tool is rotated in the first direction of rotation for the peeling time. An improved, reproducible peeling result can thus be obtained. In one configuration, the food processor, in particular the memory connected with the control device, comprises at least two predefined pairs of values, wherein the first pair of values comprises a first peeling time for a first weight and the second pair of values comprises a second peeling time for a second weight. The food processor, in particular the control device, determines a peeling time in the first direction of rotation by linearly interpolating based on the two predefined pairs of values, based on the weight of the potatoes in the food preparation vessel.

In one embodiment, the food processor determines the peeling time depending on the weight and/or the potato size, and the tool is rotated for the peeling time in the first direction of rotation. By potato size, preferably an approximately average size of the potatoes or potato pieces in the food preparation vessel is meant. A size of the potatoes can be described by a maximum spatial extent in an arbitrary axis. In one configuration, if the potato size is not entered by the user, it is provided to use a maximum extension as a measure for the potato size and/or to equate the diameter of the lid opening (in FIG. 1, reference 12) of the lid of the food preparation vessel with the potato size. A sufficient estimation without additional processor load for a separate determination of the potato size can be achieved in this way.

In one configuration, the food processor comprises at least two predefined pairs of values, wherein the first pair of values comprises a first peeling time for a first weight and/or a first potato size and the second pair of values comprises a second peeling time for a second weight and/or a second potato size. The food processor, in particular the control device, determines the peeling time in the first direction of rotation by linear interpolation on the basis of the two predefined pairs of values. In other words, the food processor determines the peeling time in the first direction of rotation by linearly interpolating, based on the weight of the potatoes in the food preparation vessel, a peeling time based on the two predefined pairs of values.

The above embodiments are based on the knowledge that a linear interpolation based on two pairs of values is sufficiently precise to achieve a sufficiently reproducible peeling result when peeling potatoes by means of a potato peeling disc attached to the tool of the food processor. The complexity of the determination and consequently the load on the processor and the memory of the control device can thus be reduced.

In one embodiment, the following steps are provided:

- a control device accesses at least one value corresponding to a weight and/or a potato size of potatoes in the food preparation vessel;
- the control device accesses a plurality of predefined pairs of values indicating a peeling time for specific values of the weight, the potato size and/or the rotational speed;
- the control device receives a user input for the rotational speed in the first direction of rotation, e.g. via a user interface, or determines the rotational speed based on the weight and/or potato size, preferably by means of formulas or a look-up table, so that certain ranges of the input variable (weight and/or potato size) are assigned a predefined output variable (rotational speed);
- the control device performs a linear interpolation based on the weight and/or the potato size on the basis of the predefined pairs of values for the rotational speed in the first direction of rotation to determine the peeling time; and/or
- the control device causes a drive of the food processor to rotate the tool at the rotational speed for the peeling time in the first direction of rotation.

By adjusting the rotational speed to the potatoes in the food preparation vessel, the peeling result is further improved.

In one embodiment, the rotational speed for the first direction of rotation is at least 450 rpm and/or at most 1200 rpm. An improved peeling result can thus be reliably achieved.

In one embodiment, for peeling potatoes, the tool is rotated at about 500 rpm or about 800 rpm or about 1100 rpm in the first direction of rotation. In particular, these values correspond to the predefined rotational speed for the first direction of rotation. An improved peeling result can thus be reliably achieved. “About” means a deviation of 10%. A significant reduction in the total peeling time is already enabled by 800 rpm. By 1100 rpm, when using a food processor for peeling potatoes, foaming is reduced, especially in combination with the addition of cooking oil.

In a food processor, in contrast to a specialized potato peeling machine, the mixing and/or chopping tool also rotates so that during a peeling process in a water bath, depending on the rotational speed, upward flows of water in the food preparation vessel having different intensities arise, which has an influence on the effects described above.

In one configuration, the tool is rotated in the first direction of rotation for at least 3 minutes and/or at most 9 minutes to peel the potatoes in the food preparation vessel.

In one configuration, for peeling in particular 650 g potatoes, the tool is rotated for about 7 minutes at about 500 rpm or rotated for about 4 minutes at about 1100 rpm, wherein for intermediate rotational speeds, the tool is rotated for a peeling time that is linearly interpolated accordingly.

In one embodiment, the motorized rotation of the tool and thus the potato peeling disc for peeling the potatoes by the potato peeling disc within the food preparation vessel is initially performed at a first speed for a first peeling time, and subsequently the tool and thus the potato peeling disc for peeling the potatoes within the food preparation vessel is rotated in a motorized manner at a second speed for a second peeling time. The second speed is different from the first speed. In particular, the second speed is lower than the first speed. Speed and rotational speed mean one and the same. Preferably, the second peeling time is longer than the first peeling time in order to reduce waste.

In this way, potatoes can be peeled particularly efficiently with a food processor using a potato peeling disc. This embodiment is based on the knowledge that with an (initially) high speed, excess material (projections) is removed from the potatoes. With the (subsequent) lower speed, the surfaces of the potatoes can be removed more quickly in a uniform manner without much waste. In this way, the total peeling time can be reduced overall with little waste.

In particular, the first speed is greater than 700 rpm, preferably greater than or equal to 1100 rpm, and/or at most 1250 rpm. In principle possible, although not optimal in terms of waste, is a first speed or rotational speed in the first direction of rotation of at most 2000 rpm. In particular, the first peeling time is at least 30 seconds and/or at most 120 seconds. Excess material of the potatoes can thus be effectively removed. In particular, 30 seconds is preferred at 200 g and/or 120 seconds is preferred at 1100 g weight of the potatoes in the food preparation vessel.

In particular, the second speed is greater than 350 rpm, preferably greater than or equal to 500 rpm, and/or at most 600 rpm. A particularly uniform peeling result with low waste can thus be achieved. Preferably, the second peeling time is at least 150 seconds and/or at most 240 seconds. In particular, the quotient of the second peeling time and a diameter of the potato peeling disc is at least 1 second/millimeter and/or at most 2 seconds/millimeter. A uniform peeling result with low waste can thus be achieved. For example, at 200 g weight of potatoes, a quotient of 150 s/148 mm is preferred, wherein 148 mm is a preferred diameter of the potato peeling disc. For example, at 1100 g weight, a quotient of 240 s/148 mm is preferred. Since specialized potato peeling machines typically have a very large bottom diameter which is often twice that of a food processor, the peeling time is to be considered specific to the peeling area, which is proportional to the diameter. In particular, the control device is configured such that the food processor is caused to rotate the tool at the first speed for the first peeling time and at the second speed for the second peeling time.

In one configuration, water is added to the food preparation vessel prior to peeling potatoes, at least to immerse the entire potato peeling disc and/or to no more than 5 cm above the uppermost point of the mixing or chopping tool of the food processor.

In one configuration, after the rotation of the tool in the first direction of rotation, a motorized rotation of the tool and thus simultaneously of the potato peeling disc is performed in the opposite second direction of rotation, wherein the abrasive structure on the surface of the potato peeling disc is such that, when rotating in the first direction of rotation, potatoes are peeled and, when rotating in the second direction of rotation, a roughened potato surface is smoothed, which had been roughened by the previous peeling. Smoothing, also called polishing, of the surface of the potato can thus be enabled.

In one configuration, the time duration of the rotation in the second direction of rotation is at least 10 seconds and/or at most 60 seconds. A uniform smoothing of a roughened potato surface can thus be ensured. In particular, the control device is configured such that the food processor is caused to rotate the tool at the first speed or the predefined rotational speed for the peeling time and at the second speed for the time duration for a smoothing.

A further aspect of the present disclosure relates to a food processor for performing the method as described above. The food processor comprises for food preparation a removable food preparation vessel, a heating element for heating a food in the food preparation vessel, a rotatable tool for mixing or chopping the food in the food preparation vessel which is located centrally at a bottom of the food preparation vessel, and a potato peeling disc having an abrasive structure on its surface. The potato peeling disc can be or is attached to the tool from above, such that the potato peeling disc is manually releasable and rotationally coupled to the tool so that, in operation, potatoes can be added to the food preparation vessel from above the potato peeling disc and the potato peeling disc rotates at the same rotational speed as the tool when the tool is rotated in a motorized manner in a first direction of rotation for peeling the potatoes with the potato peeling disc inside the food preparation vessel. The advantages, definitions and configurations of the aspect of the present disclosure described at the beginning may be applied to this aspect of the present disclosure.

In one embodiment, the potato peeling disc has a central opening formed by an inner contour which is at least 10 mm long and extends parallel to the central axis and, after attaching to the tool, rests against an outer circumferential surface of the tool for at least 10 mm in such a way that, when the food preparation vessel is filled with 800 g of potatoes, the potato peeling disc maintains its position essentially unchanged, i.e. does not tilt sideways, for example. Even a potato peeling disc with a diameter of approx. 150 mm, whose horizontal orientation is only held by the releasable connection of the inner contour on the tool, can withstand the load as a result. Preferably, the diameter of the opening is at least 17 mm and/or at most 19 mm. In particular, the inner contour includes, preferably by means of a U-shaped cut-out, a latch arm extending parallel to the central axis and having a latching lug projecting radially inwardly relative to the central axis. During attaching, the latch arm is displaced radially outward and thus pivoted so that the latching lug can slide along the outer circumferential surface of the tool until the latching lug snaps into an annular groove of the outer circumferential surface of the tool when the intended attaching position is reached. When water is flushed upward through the rotating tool from below during operation, the potato peeling disc remains in the intended, axial attaching position. In this way, a preferably provided driver on the lower side of the potato peeling disc remains reliably coupled in rotation with the tool, more precisely with one of the radial arms of the tool. The potato peeling disc can therefore always rotate reliably with the tool.

In one embodiment, the food processor comprises an integrated weight sensor for determining a weight of potatoes to be peeled located in the food preparation vessel and/or a control device is configured such that a peeling time for the first direction of rotation is determined depending on the weight.

In one embodiment—or in a further aspect of the present disclosure relating to a food processor having a food preparation vessel, a heating element, a tool for mixing or chopping and a potato peeling disc—the abrasive structure on the surface of the potato peeling disc is a structure with geometrically undefined cutting edge. In particular, the abrasive structure is produced by an abrasive means. In one configuration, the abrasive structure with geometrically undefined cutting edge is provided with a cover layer. This facilitates cleaning. In one configuration, the abrasive structure is provided as a separate layer that can be attached to the surface of the potato peeling disc and released non-destructively. This facilitates renewal of the abrasive structure in the event of wear. In one configuration, the abrasive structure with geometrically undefined cutting edge is integrated on the surface and/or provided by the cover layer in such a way that the abrasive structure can peel potatoes in the first direction of rotation and not peel, in particular smooth, potatoes in the second direction of rotation. For this purpose, the cover layer can, for example, form a plurality of ramps which result in the abrasive structure being smoothed by the cover layer in the second direction of rotation and being able to peel only in the first direction of rotation.

In one embodiment, the abrasive structure on the surface of the potato peeling disc is a structure with geometrically defined cutting edge. In particular, the abrasive structure is formed by a plurality of projections, each projection extending over an area of at least 5 $mm^2$ and/or at most 20 $mm^2$ on the surface of the potato peeling disc. Preferably, the projections are spaced apart from each other, preferably at least by a distance corresponding to one half of the extent of a projection in the direction of the spacing. Particularly preferably, the distance in the circumferential direction is at least 1 mm and/or at most 4 mm, particularly preferably about 3 mm. Preferably, the lateral distances are about as large as the distances in the circumferential direction and/or at least 1 mm and/or at most 4 mm, particularly preferably about 3 mm. In particular, the maximum height of the projections is at least 0.5 mm and/or at most 2 mm, particularly preferably about 1 mm.

In a preferred configuration, the projections are teeth, in particular having a ramp shape. Preferably, the teeth have a rectangular extension on the surface.

Another aspect of the present disclosure relates to a method for preparing a food with a food processor in a removable food preparation vessel by means of a heating element for heating a food in the food preparation vessel and a rotatable tool for mixing or chopping the food in the food preparation vessel, wherein the method comprises the following steps: manually releasing a potato peeling disc that had been attached to a tool for mixing or chopping of a food processor for peeling potatoes such that an abrasive structure of a surface of the potato peeling disc faced upward; manually turning around the potato peeling disc; attaching the potato peeling disc with the abrasive structure facing downward to the tool, such that the abrasive structure faces a bottom of the food preparation vessel; rotating the tool. In particular, the potato peeling disc does not rotate at the same rotational speed with the tool when the potato peeling disc is attached to the tool with the abrasive structure facing downward. The definitions, configurations and explanations of the aspects of the present disclosure described above and the figure description herein also apply to this aspect of the disclosed system and method.

In one embodiment—or a further aspect relating to a potato peeling disc for peeling potatoes for use and operation with a food processor by mounting and rotationally coupling the potato peeling disc with a rotatable tool for mixing or chopping of the food processor—an angular tooth is provided, in particular a cuboid tooth, wherein a plurality of the teeth are positioned on a surface of the potato peeling disc and/or face with a front surface tangential, substantially tangential or parallel to a circumferential direction. Thus, the orientation of the teeth is in the circumferential direction or at least substantially in the circumferential direction. In particular, the teeth have a first surface at the rear side with an angle as to the surface of the potato peeling disc and/or a second surface at the front side, i.e. in particular the front surface, with an angle $\beta$ to the surface of the potato peeling disc. A plateau, which is preferably straight and/or substantially parallel to the surface of the potato peeling disc, connects the first surface and the second surface. In particular, the angle $\alpha$ and/or the angle $\beta$ is between 80° and 100°, preferably about 90°. A normal of the first and/or second surface is oriented tangentially, substantially tangentially, or parallel to the circumferential direction of the potato peeling disc.

In particular, a normal of the first surface and a normal of the second surface lie in a plane that is preferably oriented parallel to the central axis.

The invention claimed is:

1. A method for peeling potatoes with a food processor, the food processor comprising a removable food preparation vessel for food preparation, a heating element for heating a food in the food preparation vessel, and a chopping tool rotatable about a central axis for chopping the food in the removable food preparation vessel, wherein the rotatable chopping tool has an outer circumferential surface with an annular groove, the method comprising:

attaching a potato peeling disc, wherein a surface of the potato peeling disc defines an abrasive structure, from above to the rotatable chopping tool that is located centrally at a bottom of the removable food preparation vessel to establish a manually releasable, rotationally coupled connection therebetween, such that, during operation, the potato peeling disc rotates at a same rotational speed as the rotational tool, wherein the potato peeling disc comprises a latch arm with a latching lug, such that during attaching the potato peeling disc to the rotatable chopping tool, the latch arm is displaced radially outward so that the latching lug slides axially along the outer circumferential surface of the rotatable chopping tool until the latching lug snaps into the annular groove of the outer circumferential surface of the rotatable chopping tool when the intended axial attaching position is reached;

adding potatoes into the removable food preparation vessel from above onto the potato peeling disc; and causing motorized rotation of the rotatable chopping tool in a first direction of rotation and peeling of potatoes with the potato peeling disc inside the removable food preparation vessel.

2. The method of claim 1, wherein the potato peeling disc attached to the rotatable chopping tool rotates in a second direction of rotation.

3. The method of claim 2, further comprising changing multiple times rotation of the rotatable chopping tool between the first direction of rotation and the second direction of rotation.

4. The method of claim 1, wherein the food processor is configured to operate in a potato peeling mode, and wherein, upon activation of the potato peeling mode, the food processor causes the rotatable chopping tool to be rotated at a predefined rotational speed in the first direction of rotation.

5. The method of claim 1, further comprising
determining, by the food processor, a weight of the potatoes in the removable food preparation vessel; and
determining, by the food processor, a peeling time based on the determined weight, wherein the rotatable chopping tool is rotated in the first direction of rotation for the peeling time.

6. The method of claim 5, further comprising:
obtaining or determining, by the food processor, a potato size of the potatoes in the removable food preparation vessel; and
determining, by the food processor, a peeling time based on the potato size, wherein the rotatable chopping tool is rotated in the first direction of rotation for the peeling time.

7. The method of claim 6, wherein the food processor determines the peeling time based on the weight and the potato size, and wherein the rotatable chopping tool is rotated in the first direction of rotation for the peeling time.

8. The method of claim 6, wherein
the food processor is equipped with at least two predefined pairs of values, wherein the first pair of values comprises a first peeling time for a first weight and/or for a first potato size, and the second pair of values comprises a second peeling time for a second weight and/or for a second potato size, and
wherein the food processor determines the peeling time in the first direction of rotation based on a linear interpolation of the two predefined pairs of values.

9. The method of claim 1, further comprising:
accessing, by a control device, at least one value corresponding to a weight and/or a potato size of the potatoes in the removable food preparation vessel;
accessing, by the control device, a plurality of predefined pairs of values indicating a peeling time for specific values of the weight, the potato size and/or the rotational speed;
receiving, by the control device, a user input for the rotational speed in the first direction of rotation or determining, by the control device, the rotational speed based on the weight and/or the potato size;
performing, by the control device, linear interpolation on the basis of on the predefined pairs of values for the rotational speed in the first direction of rotation based on the weight and/or the potato size to determine the peeling time; and
causing, by the control device, a drive of the food processor to rotate the rotatable chopping tool at the rotational speed for the peeling time in the first direction of rotation.

10. The method claim 1, wherein the rotational speed for the first direction of rotation is at least 450 rpm and/or at most 1200 rpm.

11. The method of claim 1, wherein for peeling potatoes the rotatable chopping tool is rotated at about 500 rpm or about 800 rpm or about 1100 rpm in the first direction of rotation.

12. The method of claim 1, wherein the motorized rotation of the rotatable chopping tool together with the potato peeling disc is initially performed at a first speed for a first peeling time and subsequently the rotatable chopping tool together with the potato peeling disc is rotated in a motorized manner at a second speed for a second peeling time, wherein the second speed differs from the first speed, and wherein the second speed is lower than the first speed.

13. The method of claim 1, wherein water is flushed upward by the rotating chopping tool from below during operation of peeling potatoes with the potato peeling disk, wherein the potato peeling disc remains in the intended, axial attaching position due to a snap-fit connection between the latching lug and the annular groove, and/or the potato peeling disc has a central opening formed by an inner contour which extends parallel to the central axis for at least 10 mm when the potato peeling disk is attached to the rotatable chopping tool.

14. The method of claim 13, wherein when attaching, a user first places the potato peeling disc with the central opening centered on a free end of the rotatable chopping tool that has the annular groove, the rotatable chopping tool has a radially extending arm with a cutting edge for rotation coupling with a driver of the potato peeling disc on its bottom side, the free end of the rotatable chopping tool is extends upward, the free end of the rotatable chopping tool is centered on the central axis and the free end of the rotatable chopping tool is rotationally symmetrical.

15. The method of claim 13, wherein the inner contour includes a U-shaped cut-out that creates the latch arm and/or the latching lug is arranged at a free end of the latch arm.

16. The method of claim 1, wherein the latch arm springs back radially inward and/or resumes its position oriented parallel to the central axis after latching.

* * * * *